United States Patent [19]

Welmers et al.

[11] Patent Number: 5,435,918
[45] Date of Patent: * Jul. 25, 1995

[54] SOLVENT EXTRACTION PROCESS INVOLVING MEMBRANE SEPARATION OF EXTRACT PHASE AND/OR INTERMEDIATE ZONE PHASE

[75] Inventors: Adrianus Welmers; Laura E. Black, both of Sarnia, Canada

[73] Assignee: Exxon Research & Engineering Co., Florham Park, N.J.

[ * ] Notice: The portion of the term of this patent subsequent to Aug. 10, 2010 has been disclaimed.

[21] Appl. No.: 74,573

[22] Filed: Jun. 10, 1993

Related U.S. Application Data

[60] Division of Ser. No. 732,011, Jul. 18, 1991, Pat. No. 5,234,597, which is a continuation-in-part of Ser. No. 609,564, Nov. 5, 1990, abandoned.

[51] Int. Cl.⁶ .............................................. B01D 61/04
[52] U.S. Cl. ..................................... 210/634; 210/652
[58] Field of Search ............... 210/640, 634, 650, 651, 210/708, 652, 749, 804, 806; 427/245, 246

[56] References Cited

U.S. PATENT DOCUMENTS

| | | | |
|---|---|---|---|
| 3,951,815 | 4/1976 | Wrasedlo | 210/500 |
| 4,277,344 | 7/1981 | Cadotte | 210/654 |
| 4,311,583 | 1/1982 | Woodle | 208/312 |
| 4,328,092 | 5/1982 | Sequeria, Jr. | 208/326 |
| 4,464,494 | 8/1984 | King et al. | 523/400 |
| 4,510,047 | 4/1985 | Thompson | 208/321 |
| 4,582,726 | 4/1986 | Shuey et al. | 427/208.8 |
| 4,592,832 | 6/1986 | Bristow et al. | 208/309 |
| 4,816,140 | 3/1989 | Trambouze et al. | 208/309 |
| 4,943,475 | 7/1990 | Baker et al. | 428/246 |
| 4,978,454 | 12/1990 | Sweet | 210/640 |
| 5,095,170 | 3/1992 | Chen et al. | 585/804 |
| 5,120,900 | 6/1992 | Chen et al. | 585/804 |
| 5,173,191 | 12/1992 | Black | 210/654 |
| 5,234,597 | 8/1993 | Welmers et al. | 210/651 X |

FOREIGN PATENT DOCUMENTS

| | | |
|---|---|---|
| 145126 | 6/1985 | European Pat. Off. . |
| 217534 | 4/1987 | European Pat. Off. . |
| 244277 | 11/1987 | European Pat. Off. . |
| 421676 | 4/1991 | European Pat. Off. . |
| 2595370 | 9/1987 | France . |
| 2595371 | 9/1987 | France . |

OTHER PUBLICATIONS

"In Situ-Formed Condensation Polymers For Reverse Osmosis Membranes: Second Phase" North Star Research Inst., Dept. of Interior, NTIS #PB234198.
"Continued Evaluation of In Situ-Formed Condensation Polymers For Reverse Osmosis Membranes", Midwest Research Inst., Dept. of Comm. NTIS #PB 253193.
"Liquid Extraction", 2d Ed. R. E. Treybol, McGraw-Hill Book Co., 1963, pp. 144–145; 270–273.

*Primary Examiner*—Frank Spear
*Attorney, Agent, or Firm*—Joseph J. Allocca

[57] ABSTRACT

The solvent extraction of aromatics containing oil using a selective aromatics extraction solvent to produce an aromatics rich extract phase and an oil rich/aromatics lean raffinate is improved by the steps of subjecting the extract phase to a membrane separation step to produce a permeate phase and a retentate phase passing the retentate phase to a settling zone wherein the retentate phase spontaneously separates into two liquid phases, and recycling the upper phase to the extraction zone, either to the feed inlet or to the bottom of the extract reflux zone to thereby increase the raffinate oil recovered from the extraction tower. Alternatively or in addition to the above, a side stream can be taken from an intermediate zone of the extraction zone (e.g. extraction tower) and fed to a membrane separation to produce a solvent rich permeate and an oil rich retentate. The solvent rich permeate is recycled while the oil rich retentate is fed to a settling zone wherein it will spontaneously separate into an oil rich pseudo raffinate upper phase which is recovered and into a solvent rich pseudo extract bottoms phase which is recycled to the solvent extraction zone, preferably at a point below that at which the side stream was withdrawn. The membrane separation zone preferably employs interfacially polymerized membranes under reverse osmosis conditions.

8 Claims, 2 Drawing Sheets

SOLVENT EXTRACTION PROCESS INVOLVING MEMBRANE SEPARATION OF EXTRACT PHASE AND/OR INTERMEDIATE ZONE PHASE

This is a division of application Ser. No. 732,011, filed Jul. 18, 1991, now U.S. Pat. No. 5,234,597, which is a CIP of Ser. No. 609,564, filed Nov. 5, 1990, now abandoned.

BRIEF DESCRIPTION OF THE INVENTION

The solvent extraction of aromatics containing oil using a selective aromatics extraction solvent to produce an aromatics rich extract phase and an oil rich-/aromatics lean raffinate is improved by the steps of subjecting the extract phase preferably containing from about 5 to about 25% oil, more preferably containing about 10 to about 18% oil to a membrane separation step to produce a permeate phase and a retentate phase and passing the retentate phase to a settling zone such as a settling drum wherein the retentate phase spontaneously separates into two liquid phases. The upper phase, containing good quality lubricating oil molecules can be recycled to the extraction zone, either to the feed inlet or to the bottom of the extract reflux zone to thereby increase the raffinate oil recovered from the extraction tower.

Alternatively or in addition to the above a side stream can be taken from an intermediate zone of the extraction zone (e.g. extraction tower) and fed to a membrane separation unit wherein the mixed extract solution/raffinate solution feed stream taken from the intermediate zone of the extraction zone is fed to a membrane separation zone to produce a solvent rich permeate and an oil rich retentate. The solvent rich permeate is recycled while the oil rich retentate is fed to a settling zone wherein the oil rich retentate will spontaneously separate into an oil rich pseudo raffinate upper phase which is recovered and into a solvent rich pseudo extract bottoms phase which is recycled to the solvent extraction zone, preferably at a point below that at which the side stream was withdrawn.

The membrane separation zone for the separation of solvent from the extract phase, raffinate phase or intermediate phase may employ regenerated cellulose membrane under reverse osmosis conditions as taught in U.S. Pat. No. 4,510,047 or, preferably the interfacially polymerized membranes disclosed and claimed in copending application U.S. Ser. No. 417,333 filed Oct. 5, 1989 in the name of Laura E. Black.

The preferred interfacially polymerized, crosslinked membranes on microporous, organic solvent resistant ultrafiltration membrane backing useful for the separation of organic solvents and organic solutes under reverse osmosis conditions are prepared by depositing an aqueous (or conversely non-aqueous) solution of a first reactant component on the micro-porous backing support layer, draining off the excess quantity of this first solution and then applying a second reactant component in the form of a non-aqueous (or conversely aqueous) solution. The two components interact and polymerize at the interface between the aqueous phase and the non-aqueous phase to produce a highly crosslinked thin polymer layer on the micro porous ultrafiltration support backing layer.

The membranes are generally prepared by reacting multi-functional amino compounds dissolved in water with a second polyfunctional agent dissolved in organic solvents. The amino compounds can be aliphatic, alicyclic or aromatic. The polyfunctional agents that the amines are reacted with can include di- and tri- acid chlorides, acid anhydrides, aliphatic and aromatic diisocyanates, thioisocyanates, chloroformates and sulfonyl chlorides. Organic solvent resistant backings which can be used include nylon (e.g. nylon 66), cellulose, polyester, teflon, polypropylene and other insoluble polymers. These membranes are useful for separating mixtures of organic liquids under reverse osmosis conditions. They are particularly useful for separating aromatics extraction solvents (such as N-methyl pyrollidone, furfural, phenol etc.) from mixtures of same with oil or aromatic hydrocarbons in raffinate or extract solutions resulting from the solvent extract process.

BACKGROUND OF THE INVENTION

The separation of solutes from organic solvents is desirable in many processes. It would be useful to have a reverse osmosis membrane that was insoluble in all organic solvents, and showed a high rejection for various solutes. Such a membrane could be useful in purifying streams that would degrade or dissolve many other membranes.

Interfacially polymerized membranes were initially discovered in the 1970's for use in water desalination (see "In Situ-formed Condensation Polymers for Reverse Osmosis Membranes: Second Phase", North Star Research Institute, prepared for Department of the Interior, July 1974, available from NTIS, report #PB-234 198; "Continued Evaluation of In Situ-formed Condensation Polymers for Reverse Osmosis Membranes", Midwest Research Institute, prepared for Office of Water Research and Technology, April 1976, available from NTIS, report #PB-253 193; "Interfacially Synthesized Reverse Osmosis Membrane", U.S. Pat. No. 4,277,344, Jul. 7, 1981, assn. to Film Tec Corporation). Prior art only describes the use of these membranes for the separation of aqueous solutions by reverse osmosis. There is no mention of the use of these membranes for the separation of solutes from organic solvents by reverse osmosis.

Interfacially polymerized membranes are composed of a highly crosslinked and generally insoluble condensation polymer which is formed in situ on a micro-porous film. Most of these membranes are formed with di- or polyamines which are reacted with multi-functional iso-cyanates or acid chlorides. Amines react very readily with both of these reactants. Several of these membranes have been commercialized for water desalination purposes by companies such as UOP, Film Tec and Desalination Systems Inc. All of the commercial membranes use a polysulfone ultrafiltration membrane (0.02 to 0.1 micron pore size) for the microporous support film. Prior art does describe the use of some other microporous support films such as polyvinylchloride ultrafiltration membranes but none of the support films mentioned are particularly resistant to organic solvents.

These membranes are formed using the following procedures. A thin layer of a dilute solution of one component, usually an aqueous solution of the amine, is put on one side of the microporous support film. A thin layer of a dilute solution of the second component, usually in a water immiscible solvent, is then put on top of the water solution layer. The order of applying the solutions can be reversed. The two components react at the water/solvent interface forming a thin (less than 1 micron thick) highly crosslinked polymer layer. This polymer layer is the active layer of the membrane at which separation occurs. Some examples of formulations mentioned in the prior art are reacting polyethylenimine with toluene diisocyanate, reacting polyethylenimine with isophthaloyl dichloride and reacting m-phenylene diamine with trimesoyl chloride.

These membranes exhibit high salt rejections from water (>95%). The commercially available membranes prepared on polysulfone ultrafiltration membranes are not suitable for separating solutes from organic solvents as these typically soften or dissolve polysulfone.

French patent 2,595,370 teaches a multiple effect extraction process using counter current solvent flow. The process utilizes a main column separated into 2 zones by a draw off tray and a second column which fractionates the side stream drawn off from the first column. The fractionation zone produces an over head raffinate which is fed back to the top zone of column 1 above the draw-off tray. The bottoms from the fractionation zone are cooled and separate into a pseudo raffinate and an extract. This extract is recycled to the bottom zone of column 1 just below the draw-off tray. It can optionally also be fed into the top zone of column 1 just above the draw-off tray. By this scheme a raffinate is recovered from the top of the first column, an extract from the bottom of said column and a pseudo raffinate from the separation zone to which the bottoms fraction from the fractionation zone is fed.

In an alternate embodiment the extract from the bottom of column 1 can be cooled to salt-out in a separation zone an upper phase of lighter hydrocarbons which is recycled back to the bottom of the bottom zone of column 1. The bottoms fraction from this separation zone is a true extract phase.

French Patent 2,595,371 teaches a process for the selective solvent extraction of a hydrocarbon mixture. Solvent is passed counter currently to the hydrocarbon feed employing 2 or more separation columns resulting in the separation of the feed into a raffinate, a pseudo-raffinate and an extract. Feed is introduced into a first column while fresh solvent is introduced into the top of a second column. The overheads from the first column constitute the feed to the second column. The bottoms from the second column are cooled and permitted to salt-out in a separation zone wherein an upper phase pseudo raffinate is recovered and a bottom phase of recycle solvent is recovered. This bottom phase recycle solvent is used as the solvent introduced into the first column. Extract is recovered from the bottom of the first column and raffinate from the top of the second column. In an alternative embodiment part of the pseudo raffinate can be cycled back to the bottom of the second column while the extract from the first column can be cooled to salt-out in a separation zone producing a upper phase of lighter hydrocarbon which is recycled to the bottom of the first column, and a true extract bottoms phase.

U.S. Pat. No. 4,311,583 teaches a solvent extraction process. A hydrocarbon feed is contacted with N-methyl pyrollidone in an extraction zone. The primary extract is separated into a secondary raffinate and a secondary extract by cooling the primary extract optionally with the addition of water or wet solvent. The secondary raffinate is separated from the secondary extract. At least part of the secondary raffinate is combined with the primary raffinate to obtain an increased yield of desired quality raffinate oil product. A part of the secondary raffinate may be returned to the lower part of the extraction zone.

U.S. Pat. No. 4,328,092 teaches the solvent extraction of hydrocarbon oils. The process uses N-methyl-2-pyrollidone. The extract from the solvent extraction zone is cooled to form two immiscible liquid phases, a secondary extract phase and a secondary raffinate phase. The secondary raffinate phase is recycled to the extraction zone resulting in increased yield of refined oil product and in energy savings.

"Liquid Extraction" 2d Ed, R. E. Treybol, McGraw-Hill Book Company, 1963 pgs 144–145, 270–273. This reference shows that extractor reflux has been practiced and that reflux for extraction operations is obtained by distillation methods, chilling or by the addition of an anti solvent.

THE PRESENT INVENTION

Figure 1:
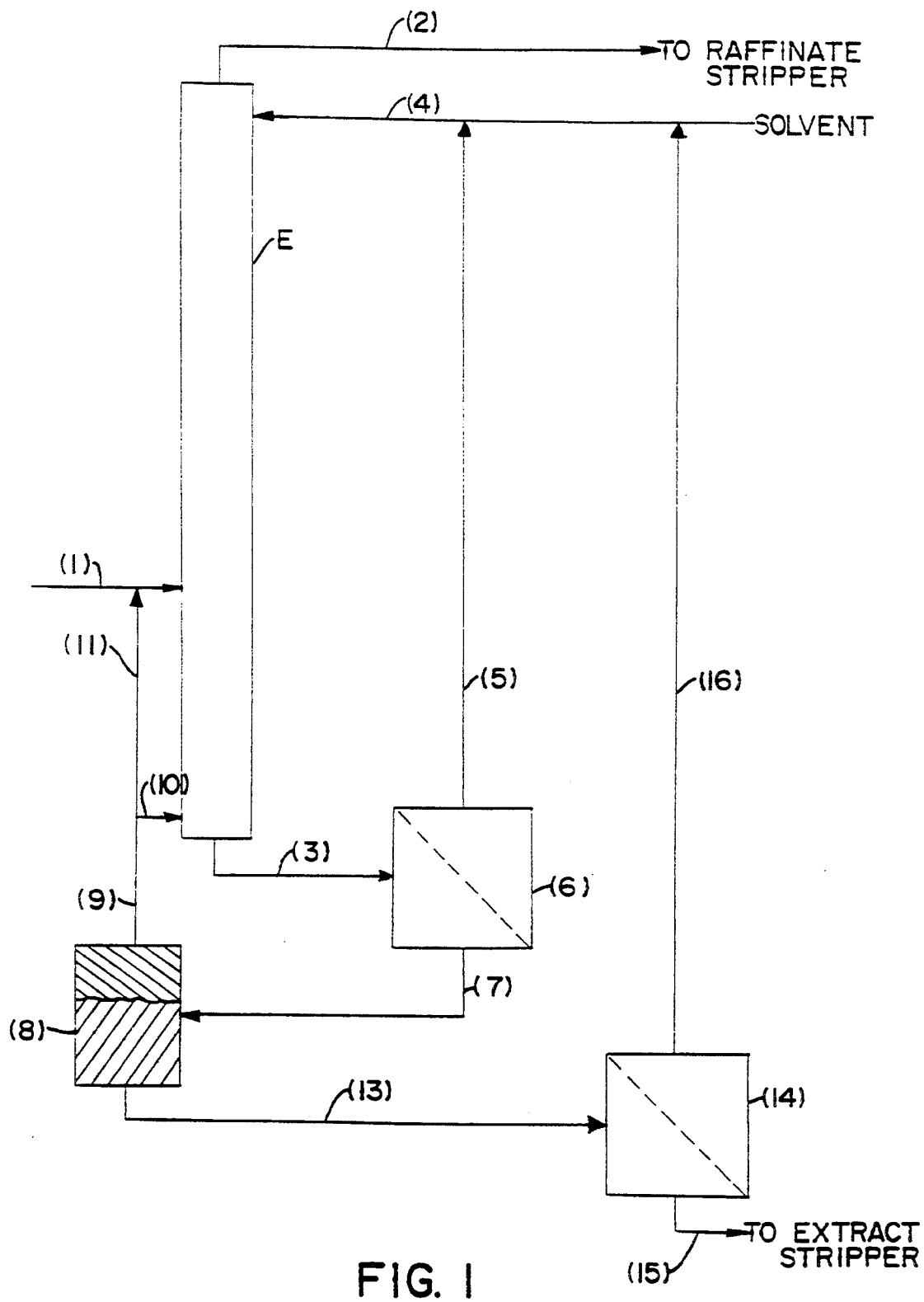
FIG. 1 presents a schematic of the present invention practiced on the extract phase with recycle of the upper phase from the settling zone to the extraction zone.

The solvent extraction of aromatics containing oil using a selective aromatics extraction solvent to produce an aromatics rich extract phase and an oil rich/aromatics lean raffinate is improved by the steps of subjecting the extract phase preferably containing from about 5 to about 25% oil, more preferably containing from about. 10 to about 18% oil to a membrane separation step to produce a permeate phase and a retentate phase and passing the retentate phase to a settling zone such as a settling drum wherein the retentate phase spontaneously separates into two liquid phases. The upper phase, containing good quality lubricating oil molecules can be recycled to the extraction zone, either to the feed inlet or to the bottom of the extract reflux zone to thereby increase the raffinate oil recovered from the extraction tower.

Alternatively or in addition to the above a side stream can be taken from an intermediate zone of the extraction zone (e.g. extraction tower) and fed to a membrane separation unit wherein the mixed extract solution/raffinate solution feed stream taken from the intermediate zone of the extraction zone is fed to a membrane separation zone to produce a solvent rich permeate and an oil rich retentate. The solvent rich permeate is recycled while the oil rich retentate is fed to a settling zone wherein the oil rich retentate will spontaneously separate into an oil rich pseudo raffinate upper phase which is recovered and into a solvent rich pseudo extract bottoms phase which is recycled to the solvent extraction zone, preferably at a point below that at which the side stream was withdrawn.

Treating a raffinate or a sidestream withdrawn from a separation tower to separate it into a pseudo raffinate and a pseudo extract by means of distillation followed by settling or by anti solvent addition and/or cooling followed by settling have been described on the literature as recited above. All of these techniques, as well as the present invention rely on introducing a change in conditions on the solution being treated so that the solution will spontaneously separate into a pseudo raffinate and a pseudo extract. However, the conventional methods of distillation, cooling or anti-solvent addition have drawbacks such that they are not actually practical to use. For example, cooling of extract solution will generate only little raffinate, limiting the yield of product to less than 20% on feed. In addition, the pseudo extract solution has to be reheated substantially before recycling to the tower.

Water addition can produce adequate yield of product, but has to be removed from the pseudo extract solution before it can be reused, and is therefore impractical. In addition, addition of water results in a loss of selectivity.

Distillation could remove part of the solvent, similar to the membrane unit, but requires a substantial amount of equipment, plus a large temperature increase to reach the solvent boiling point, followed by an equally large temperature decrease before the settling drum. Consequently partial solvent recovery using distillation has always proven to be impractical.

The process of the present invention overcomes theses disadvantages. Furthermore, use of membrane separation on the sidestream has additional benefits compared even to membrane solvent recovery on the extract. Feed contamination, e.g. Iron sulfide or other particulate matter is less likely to reach the membrane, and fouling should be less of a problem, and the extract oil at the sidestream location is less aromatic than the conventional extract, consequently, less oil will permeate, and any oil that may permeate has less effect on solvent quality and on it's subsequent use at the tower top.

The membrane separation zone for the separation of solvent from the extract phase, raffinate phase or intermediate phase may employ regenerated cellulose membrane under reverse osmosis conditions as taught in U.S. Pat. No. 4,510,047 or, preferably the interfacially polymerized membranes disclosed and claimed in copending application U.S. Ser. No. 417,333 filed Oct. 5, 1989 in the name of Laura E. Black.

The present invention preferably uses interfacially polymerized membranes on a solvent resistant backing, for the separation of the aromatic extraction solvents such as N-methyl pyrollidone (NMP), phenol, sulfolane, furfural, N,N-dimethyl formamide (DMF), dimethyl sulfoxide (DMSO), and dimethyl-acetamide (DMAc), preferably NMP, phenol or furfural from oil. The solvent resistant backing is an ultrafiltration membrane with pore sizes in the range of 0.02 to 0.1 microns and is composed of generally insoluble polymers such as nylon 6,6, cellulose, polyester, teflon, polypropylene and other insoluble polymers, preferably nylon 6,6. It has been discovered that these membranes provide much higher fluxes and oil rejections in the separation of extraction solvents from oil than do commercially available regenerated cellulose membranes (see U.S. Pat. No. 4,510,047).

In the present invention the interfacially polymerized membranes are prepared by reacting multi-functional amino reactants dissolved in water with other polyfunctional agent reactants dissolved in organic solvents. The interfacially polymerized membrane is produced on a non-selective, microporous ultrafiltration support layer which is inert in the organic media to which it will be exposed. This support layer is selected from nylon, cellulose, polyester, teflon, polypropylene, polyethylene terephthalate etc. ultrafiltration membranes having pores in the range $0.02\mu$ to $0.1\mu$.

A few examples of multi-functional amino group reactants include polyethylenimine, polyvinylamine, polyvinylanilines, polybenzylamines, polyvinylimidazolines, amine modified polyepihalohydrins, and other amine containing polymers, m-phenylene diamine, p-phenylene diamine, triaminobenzene, piperazine, piperidine, 2,4-bis (p-aminobenzyl) aniline, cyclohexane diamine, cycloheptane diamine, etc. and mixtures thereof.

The polyfunctional agents that the amines are reacted with can include di- and tri- acid halides, e.g. chlorides, acid anhydrides, aliphatic and aromatic diisocyanates, thioisocyanates, haloformates (e.g. chloroformates) and sulfonyl halides, (e.g. sulfonyl chlorides), and mixtures thereof. A few examples of these agents are trimesoyl chloride, cyclohexane-1,3,5 tricarbonyl chloride, isophthaloyl chloride, terephthaloyl chloride, diisocyanatohexane, cyanuric chloride, diphenylether disulfonyl chloride, formyl chloride, acetyl chloride, propionyl chloride, butyryl chloride, valeryl chloride, caproyl chloride, heptanoyl chloride, valeryl chloride, caproyl chloride, heptanoyl chloride, octanoyl chloride, pelargonyl chloride, capryl chloride, lauryl chloride, myristyl chloride, polmityl chloride, margaryl chloride, stearyl chloride etc., oxalyl chloride, malonyl chloride, succinyl chloride, glutaryl chloride, fumaryl chloride, glutaconyl chloride, acetic anhydride, propionic anhydride, butyric anhydride, phthalic anhydride, ethylene diisocyanate, propylene diisocyanate, benzene diisocyanate, toluene diisocyanate, naphthalene diisocyanate, methylene bis (4-phenylisocyanate), ethylene thioisocyanate, toluene thioisocyanate, naphthalene thioisocyanate, ethylene bischloroformate, propylene bischloroformate, butylene bischloroformate, 1,3-benzenedisulfonyl chloride, 1,4 benzene disulfonyl chloride, 1,3-naphthalene disulfonyl chloride and 1,4-naphthalenedisulfonyl chloride, etc. and mixtures thereof.

A crosslinked membrane is used in the present invention to ensure stability in the organic solutions. A crosslinked polymeric film is formed if these membranes are prepared with one of the reagents being at least trifunctional. The degree of crosslinking is primarily controlled by the concentration of the reactant solution with higher concentrations leading to higher degrees of crosslinking. Membranes prepared from high concentration solutions generally show higher solute rejections when tested under reverse osmosis conditions.

In general the interfacially polymerized membranes are produced using 0.1 to 10 wt % aqueous solutions of the amines, preferably 0.25 to 5 wt % aqueous solutions of the amines; and 0.1 to 5 wt % non-aqueous solutions of the poly-functional agents, preferably 0.15 to 0.5 wt % non-aqueous solution of the poly-functional agent.

Following the sequential deposition of the two solutions, the resulting film can be heated to promote crosslinking of any unreacted amine. This post heating step can be at a temperature of about 60° to 150° C., preferably 80° to 120° C. for from 1 to 20 minutes. The concentrations of components used and drying/crosslinking times and temperatures selected from the above ranges will be selected by the practition in response to the membrane casting procedures actually employed and the casting machines or other mechanisms or equipment used.

The selective aromatics extraction solvents such as N-methyl-2-pyrollidone (NMP), phenol, furfural, N,N-dimethylformamide (DMF), dimethylsulfoxide (DMSO) and dimethylacetamide (DMAC) used to extract aromatic hydrocarbons from hydrocarbon oils such as specialty oils or white oils are themselves recovered from the raffinate phase, extract phase or both resulting from such extraction by permeation under reverse osmosis conditions through the interfacially polymerized membranes. Reverse osmosis conditions include contacting the then, interfacially polymerized crosslinked face of the membrane with the raffinate phase, extract phase, or both, preferably extract phase at a temperature between about −24° to 200° C., preferably 40° to 150° C. and under an applied pressure sufficient to overcome the osmotic pressure. Pressures on the order of 0 to 1000 psig can be used, preferably about 400 to 600 psig.

The aromatic extraction solvent recovered as permeate is recycled to the beginning of the extraction process or introduced into the extraction zone somewhat downstream of the fresh solvent inlet at a point where the composition of the membrane recovered solvent matches the composition of the solvent/oil mixture in the extraction zone.

In the case of the extraction of lubricating oil stocks, the retentate recovered from the membrane separation of the extract phase from the extraction tower is a concentrated extract solution which will spontaneously separate into two liquid phases when the retentate is allowed to settle in for example, a settling zone such as a settling drum. The upper phase from the settling drum will contain good quality lubricating oil molecules which can be recycled to the extraction tower, either to the feed inlet or to the bottom of the extract reflux zone in the extraction tower. This will increase the yield of raffinate oil recovered from the extraction tower. The bottom phase recovered from the settling drum can be further treated with membranes for additional solvent recovery or can be sent to conventional solvent recovery equipment with the recovered extract being sent on for conventional processing.

Alternatively or in addition to the above, a side stream can be taken from an intermediate zone of the extraction tower and fed to a membrane separation unit wherein the mixed raffinate solution/extract solution feed is separated into a raffinate rich permeate and an extract rich retentate according to the procedure of U.S. Ser. No. 434,735 filed November 1989 in the name of James R. Sweet, now U.S. Pat. No. 4,978,454.

According to the present invention the retentate oil rich phase if sent to a settling zone such as a settling drum will spontaneously separate into an oil rich pseudo raffinate upper phase which is recovered and into a solvent rich pseudo extract bottoms phase which is recycled to the solvent extraction tower preferably at a point below that at which the side stream was withdrawn.

The separation process could employ the interfacially polymerized membrane in the form of a spiral wound element. Fabrication of a spiral wound element would employ adhesives as disclosed in U.S. Pat. Nos. 4,464,494 and 4,582,726, hereby incorporated by reference.

Referring to the figures it is seen in FIG. 1 that hydrocarbon oil feed is fed via line 1 to the extraction zone (E). Solvent is fed via line 4 into extraction zone E and passed countercurrently to the hydrocarbon oil feed. An aromatics lean/oil rich raffinate stream is recovered via line 2 and sent to the raffinate stripper (not shown) for further processing. An aromatics rich extract phase is recovered via line 3 and fed to a membrane separation zone (6) wherein a solvent rich permeate is recovered and recycled via line 5 to line (4) for re-introduction to the extraction zone E. A retentate phase is recovered via line 7 and passed to settling zone (8) wherein it spontaneously separates into two liquid phases. The upper phase containing good quality lube oil molecules is recycled via line 9 back to extraction zone E and fed into extraction zone E via either line 10 at the bottom of the zone or via line 11 back to the feed inlet line 1. The bottoms layer from settler 8 may be fed via line 13 to membrane separation unit 14 wherein a solvent rich permeate is recovered via line 16 and recycled to line 4 for re-introduction to extraction zone E. The retentate is recovered via line 15 and sent to the extract stripper, not shown, for further processing. Alternatively, the bottoms phase from settler 8 may be sent via bypass line (17) directly to the extract stripper (not shown) for further processing.

Figure 2:
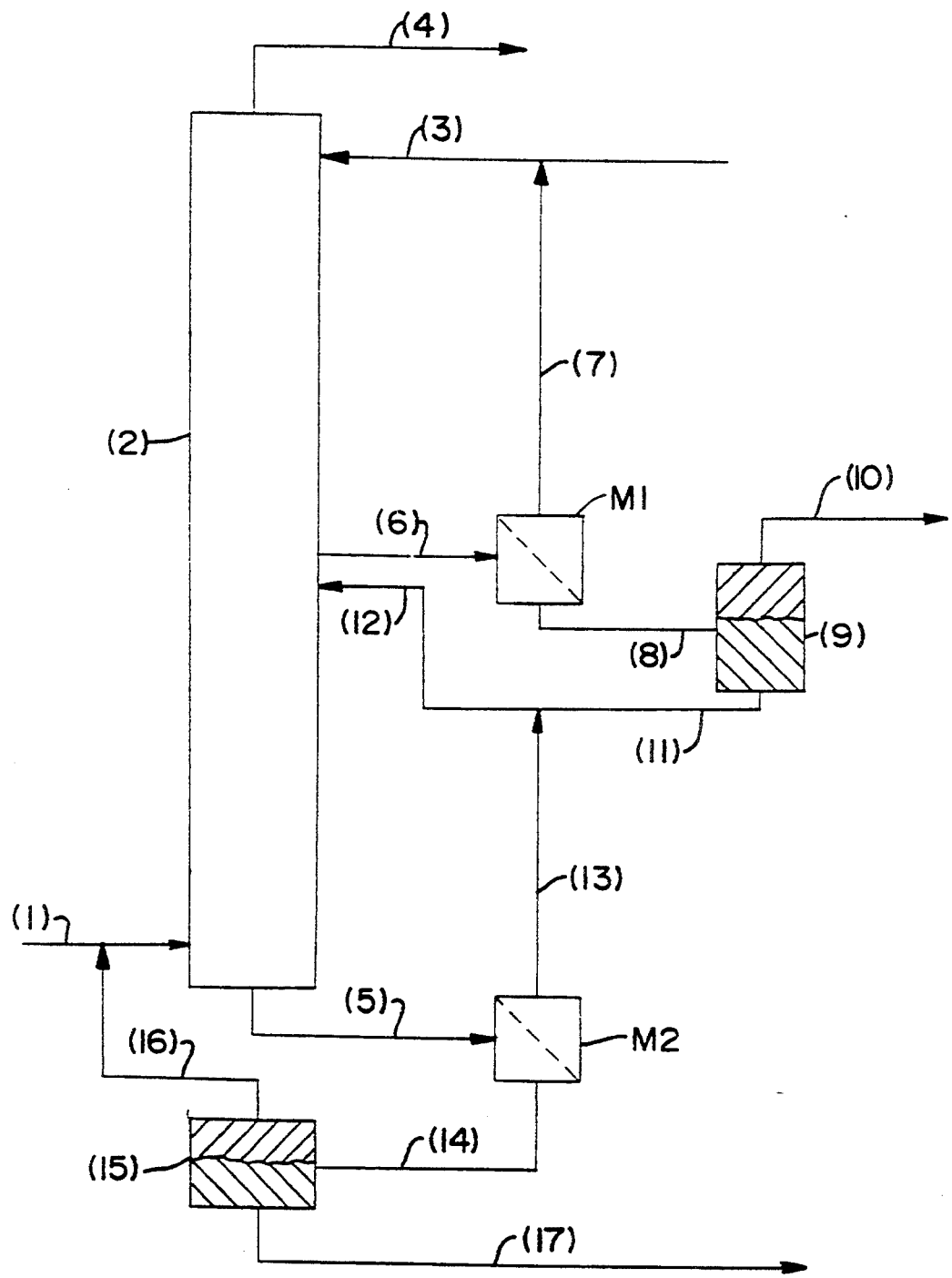
FIG. 2 presents a schematic of the present invention practiced on both an intermediate zone side stream and on the extract phase.

FIG. 2 is a variant of the current process. Hydrocarbon feed is introduced via line (1) into extraction zone (2). Fresh and/or recycled solvent is fed into extraction zone (2) via line (3). The solvent and hydrocarbon feed are countercurrently contacted in zone (2). An intermediate extraction solution stream is withdrawn from zone (2) via line (6) and fed to membrane separation zone (M1) wherein a solvent rich permeate stream is recovered via line (7) and recycled to zone (2) via line (3). A retentate phase is recovered via line (8) and fed to a settling zone (9) wherein it spontaneously separates into two liquid phases, a pseudo raffinate recovered via line (10) and a pseudo extract recovered via line (11) and fed via line (12) back to the extraction zone (2) at a point somewhat lower than that at which the intermediate zone side stream was withdrawn. An extract phase is recovered from zone (2) via line (5) and fed to membrane separation zone (M2) wherein a solvent rich permeate is recovered via line (13) and recycled to lines (11) and (12) for re-introduction into the extraction zone (2). A retentate is recovered via line (14) and fed to a settling zone 15 wherein the retentate spontaneously separates into two liquid phases. The upper phase containing good quality oil molecules is recycled via line 16 to line 1 for introduction as feed back into extraction zone 2. The bottoms phase recovered via line 17 can be separated into solvent and extract in a membrane zone or other separation zone (not shown) for appropriate disposition.

EXPERIMENTAL

EXAMPLE 1

A 50 wt % water solution of polyethylenimine was used as supplied from Aldrich (Aldrich cat #18,197-8). A sample of diphenyl methane -4,4 diisocyanate (also referred to as methylene diisocyanate or MDI) was used as received from BASF Wyandotte Corporation. Ultipor nylon 66 membranes with $0.1\mu$ pore size were used as supplied by Pall Ultrafine Filtration Corporation.

The polyethylenimine (PEI) was further diluted with deionized water to prepare several solutions with various PEI concentrations ranging from 0.35 to 2.6 wt %. A toluene/hexane solution containing approximately 0.4 wt % MDI was prepared. Several membranes were prepared using the following procedure.

A disc of the nylon 6,6 membrane support was installed in a wash coat cell where one side of the membrane was left exposed. A polyethylenimine solution was poured over the exposed side of the membrane and was allowed to remain for 1 minute. The excess solution was then drained off the membrane for 1 minute. The MDI solution was then poured over the exposed side of the membrane and was allowed to remain for 1 minute and was then drained for 1 minute. The membrane was then placed in an oven (at temperatures >100° C.) for 10 minutes. After this heat treatment, the resulting interfacially polymerized, crosslinked polyurea membrane was ready for testing.

The membrane performance was tested by circulating a sample of an extract oil solution (average molecule weight of oil=400 g/mole) containing 12 vol % oil in NMP over the thin interfacially polymerized crosslinked face of the membranes at 70° C. and at an applied feed pressure of 500 PSIG. The permeate yield was kept below 5% to ensure that the feed composition did not change during testing. The membranes were tested for 2 to 3 hours, during which time the membrane flux was recorded and permeate samples collected. The membranes were then left in the test unit overnight in the extract solution at ambient temperatures with no applied feed pressure. The next morning, the membranes were retested for an additional 2 to 3 hours with additional permeate samples being collected. The volume percent oil in both the feed and the permeate samples were measured.

The interfacially polymerized membranes had fluxes ranging from about 200 to 750 $1/m^2$day with corresponding oil rejections of >98 vol % to 88 vol % (Table 1). Both the concentration of the polyethylenimine in the water wash solution and the heat treatment temperature affected the membrane performance. The high oil rejection of >98% was obtained with the highest PEI concentration tested of 2.63%.

TABLE 1

EQUILIBRIUM PERFORMANCE OF INTERFACIALLY POLYMERIZED MEMBRANES*

Temperature = 70° C.
Pressure = 500 psig
Feed = 12 vol % 150N extract oil/NMP
Membrane: prepared by reacting aqueous solution of polyethylenimine with 0.4 wt % methylene diisocyanate in toluene/hexane on a 0.1μ nylon 6,6 ultrafiltration membrane

| Run No. | wt % PEI in Water | Heat Treatment Temperature °C. | Flux $1/m^2$ day | Oil Rejection(1) vol % |
|---|---|---|---|---|
| A | 2.63 | 135 | 210 | >98 |
| B | 2.63 | 145 | 196 | >98 |
| C | 0.67 | 145 | 750 | 88 |
| D | 0.67 | 112 | 330 | 94 |
| E | 0.35 | 112 | 477 | 96 |

*performance at end of the second test period after the membranes had soaked in the feed solution overnight
(1)oil rejection accurate to ±1.5 vol %

After the overnight soak period, the flux exhibited by the membranes increased by about 50 $1/m^2$day. The reason for this increase is not understood. The membrane rejection stayed essentially the same or increased in a couple of cases. The long term stability of these membranes in NMP solutions is not yet known.

EXAMPLE 2

A 50 wt % aqueous solution of polyethylenimine was used as supplied from Aldrich (Aldrich cat #18,197-8). Samples of diphenyl methane -4,4 diisocyanate (also referred to as methylene diisocyanate or MDI) and toluene diisocyanate were used as received from BASF. Isophthaloyl dichloride (IPDC), trimesoyl chloride, 1,3-phenylene diamine and 1,4-phenylene diamine (1,4-PDA) were used as supplied from Aldrich. Ultipor nylon 6,6 membranes with 0.04μ pore size were used as support membranes as supplied by Pall Ultrafine Filtration Corporation.

Membranes prepared by reacting polyethylenimine with methylene diisocyanate were made as follows. The PEI was diluted with deionized water to prepare several solutions with PEI concentrations ranging from 0.25 to 1.0 wt %. The MDI was dissolved in a 35/15 w/w toluene/hexane mixture to prepare several solutions with MDI concentrations ranging from 0.25 to 0.6 wt %. A disc of the nylon 6,6 membrane was installed in a wash coat cell where one side of the membrane was left exposed. A polyethylenimine solution was poured over the exposed side of the membrane and was allowed to remain for one minute. The excess solution was then drained off the membrane for one minute. The MDI solution was then poured over the same exposed side of the membrane and was allowed to remain for one minute and was then also drained for one minute. The membrane was then placed in an oven at 110° C. for 10 minutes. After this heat treatment, the membrane was ready for testing.

Membranes prepared by reacting polyethylenimine with toluene diisocyanate were made in the same manner as described above, except that TDI solutions in hexane with concentrations ranging from 0.25% to 0.5% were used. Similarly, membranes prepared by reacting polyethylenimine with isophthaloyl dichloride were made in the same manner except that IPDC solutions in hexane with concentrations ranging from 0.5% to 1.0% were used. Membranes prepared by reacting 1,4 phenylene diamine with trimesoyl chloride were made in the same manner using aqueous solutions of 1,4-PDA ranging in concentration from 1 to 4% and hexane solutions of TMC ranging in concentration from 0.15 to 0.5%. The PDA/TMC membranes were not heat treated. Similarly, interfacially polymerized, crosslinked polyamide membranes prepared by reacting 1,3-phenylene diamine with trimesoyl chloride were made in the same manner except that aqueous solutions of 1,3-PDA ranging in concentration from 1 to 4% were used.

Membrane performance was determined by circulating a sample of an extract oil solution (average molecular weight of oil=400 g/mole) containing 13 vol % oil in NMP over the membranes at 70C at an applied feed pressure of 500 PSIG. The permeate yield was kept below 5% to ensure that the feed composition did not change during testing. The membrane flux was recorded and permeate samples collected. The volume percent oil in both the feed and the permeate samples was measured.

THE POLYETHYLENIMINE BASED MEMBRANES

For interfacial membranes prepared from polyethylenimine and methylene diisocyanate, fluxes ranging from 94 to 500 $1/m^2$day and oil rejections ranging from 90 to 99 vol % (accurate to 1.5 vol %) were obtained (Table 2). The most important parameter controlling the performance of these membranes was the concentration of the aqueous PEI solution. The concentration of the MDI solution (over the ranges studied) had only a minor effect. As the PEI concentration increased from 0.25 to 1.0 wt %, the oil rejection increased from 92 to 99 vol % and the flux decreased from 500 to 94 $1/m^2$day for membranes made with MDI concentrations of 0.5%. Increasing the MDI concentration from 0.25 to 0.6 wt % appeared to decrease the oil rejection slightly from 94 to 90% at low PEI concentrations but did not appear to have any effect at higher PEI concentrations. This slight decrease might not be a real effect as the rejection is only accurate to 1.5 vol %.

The effect of the MDI concentration on flux is not as clear. At high PEI concentrations, the MDI concentrations (within the range studied) appeared to have little effect. At lower PEI concentrations, the 0.5% MDI membranes appeared to have higher fluxes than membranes made with either lower or higher MDI concentrations. The optimum membrane for NMP/oil separations was prepared from solutions containing 0.25% PEI and 0.5% MDI which gave an oil rejection of 92 vol % and a flux of 500 l/m$^2$day.

Interfacial membranes prepared from polyethylenimine and toluene diisocyanate showed similar trends. Oil rejections ranging from 90.8 to 99 vol % and fluxes ranging from 10 to 411 l/m$^2$day were obtained (Table 3). Again, the PEI concentration was the most important factor controlling membrane performance. The TDI concentration (over the range studied) did not have any significant effect. As the PEI concentration increased from 0.25 to 1.0%, the oil rejection increased from approximately 91 to 99 vol % and the flux declined from 300–400 down to 10–50 l/m$^2$day.

In comparing membranes made with MDI and TDI, little difference can be observed for the oil rejection of membranes prepared using the same concentrations of reactants. Membranes prepared with MDI seem to show a slightly lower oil rejection (96 vol % vs 99 vol % at 0.5% PEI) but this is within the range of accuracy of these values. A major difference can be observed, however, for the fluxes exhibited by the membranes. Membranes made with MDI, in comparison to membranes made with TDI, at the same reactant concentrations, exhibit fluxes twice as high. For example, membranes prepared from a 0.25% PEI solution and a 0.5% MDI or TDI solution both gave an oil rejection of 92% but exhibited fluxes of 497 and 280 respectively. MDI is clearly preferred over TDI since it results in higher flux membranes.

Interfacially polymerized membranes were prepared by reacting polyethylenimine with isophthaloyl dichloride (Table 4). Surprisingly, these membranes exhibited low oil rejections of about 78 vol % with fluxes of 294 l/m$^2$day. According to literature (J. Macrmol. Sci. - Chem A15 (5) pp 727–755, 1981) a membrane prepared by reacting 0.5% IPC in hexane with 0.67% PEI in water, exhibits a high salt rejection from water of 99.3%. From this it can be seen that there is no direct correlation between membrane salt rejection performance and membrane oil rejection performance.

Overall, the major factors controlling the flux and oil rejection exhibited by polyethylenimine based membranes are the identity of the isocyanate or acid chlorides and the solution concentration of the reactants. Membranes reacted with MDI show higher fluxes than do membranes reacted with TDI. The flux and rejection exhibited by a membrane prepared with a particular isocyanate is controlled primarily by the solution concentration of the imine, e.g. PEI. While high rejection membranes were not obtained using isophthaloyl dichloride instead of the isocyanates, the membranes produced did exhibit the ability to separate mixtures of organic solvents and solutes under reverse osmosis conditions.

THE PHENYLENE DIAMINE BASED MEMBRANES

The phenylene diamine based membranes are usually reacted with an acid chloride such as trimesoyl chloride.

For interfacial membranes prepared from 1,4 phenylene diamine and trimesoyl chloride, oil rejections ranging from 58.5 to 97 vol % and fluxes ranging from 1270 to 580 l/m$^2$day were obtained. (Table 5). For these membranes, both the concentration of 1,4 phenylene diamine in water and trimesoyl chloride in hexane were important in controlling their performance. As the concentration of TMC increased for a given PDA concentration, the oil rejection decreased and the flux increased. This effect was particularly noticeable at the lowest PDA concentration tested at 1%. At 4%, PDA, as the TMC concentration increased from 0.15 to 0.5%, the rejection decreased from approximately 96 to 90 vol % and the flux stayed relatively constant at close to 600 l/m$^2$day. Higher concentrations of TMC might be expected to yield more highly crosslinked and hence higher rejection membranes.

The PDA concentration also had a strong impact on membrane performance. As expected, as the PDA concentration increased, the oil rejection increased and the flux decreased. The optimum membrane for NMP/oil separation was prepared from solutions containing 4% PDA and 0.15% TMC; this gave an oil rejection of 95 to 97 vol % with fluxes of 580 l/m$^2$day. Slightly lower TMC and/or slightly higher PDA concentration might give a membrane with somewhat better performance. The optimum membrane shows both higher fluxes and oil rejections than the optimum PEI/MDI membrane which gave an oil rejection of 92 vol % at a flux of 500 l/m$^2$day. Among the membranes tested, the 1,4 PDA/TMC membranes appear to be the optimum for the NMP/oil separation.

Surprisingly, for an interfacially polymerized membrane prepared from a 4% water solution of 1,3-phenylene diamine and a 0.15% hexane solution of trimesoyl chloride, an oil rejection of 70 vol % with a flux of 1050 l/m$^2$day was exhibited (Table 6). According to literature, (U.S. Pat. No. 4,277,344) these membranes exhibit salt rejections of over 99% from aqueous solutions. Again, it can be seen that there is no direct correlation between membrane salt rejection performance and membrane oil rejection performance.

The optimum interfacially polymerized membrane was prepared by reacting a 4% water solution of 1,4 phenylene diamine with a 0.15% solution of trimesoyl chloride in hexane on a nylon 6,6 ultrafiltration membrane. This membrane gave an oil rejection of approximately 96 vol % at a flux of approximately 600 l/m$^2$day for the separation of NMP from extract oil at 70° C. and a feed pressure of 500 PSIG.

Both the concentration of the diamine and the acid chloride are important in controlling the performance of the membrane.

TABLE 2

PERFORMANCE OF POLYETHYLENIMINE/METHYLENE DIISOCYANATE MEMBRANES

Feed = 13 vol % 150N extract oil/NMP
Temperature = 70° C.
Pressure = 500 PSIG
Membrane = methylene diisocyanate in 33/15 toluene/
hexane reacted with polyethylenimine in

TABLE 2-continued

PERFORMANCE OF POLYETHYLENIMINE/METHYLENE DIISOCYANATE MEMBRANES water on a 0.04μ nylon membrane

| Wt % MDI | Wt % PEI | Flux (1/m² day) | Oil Rejection (vol. %) |
|---|---|---|---|
| 0.25 | 0.25 | 221 | 94.6 |
| | 0.50 | 128 | 96.1 |
| | 0.67 | 143 | 97.6 |
| | 1.0 | 103 | 98.5 |
| 0.5 | 0.25 | 497 | 92.3 |
| | 0.50 | 223 | 96.2 |
| | 0.67 | 112 | — |
| | 1.0 | 94 | 99.0 |
| 0.6 | 0.25 | 323 | 90.0 |
| 0.5(a) | 1.0 | 50 | 99.0 |
| 0.5(a) | 0.25 | 197 | 99.0 |

(a)MDI dissolved in toluene

TABLE 3

PERFORMANCE OF POLYETHYLENIMINE/TOLUENE DIISOCYANATE MEMBRANES

Feed = 13 vol % 150N extract oil/NMP
Temperature = 70° C.
Pressure = 500 PSIG
Membrane = toluene diisocyanate in hexane reacted with polyethylenimine in water on a 0.04μ nylon membrane

| Wt % TDI | Wt % PEI | Flux (1/m² day) | Oil Rejection (vol %) |
|---|---|---|---|
| 0.25 | 0.25 | 411 | 90.8 |
| | 0.5 | 76 | 98.5 |
| | 1.0 | 10 | 98.0 |
| 0.50 | 0.25 | 280 | 92.3 |
| | 0.50 | 60 | 99.0 |
| | 1.0 | 45 | 99.0 |

TABLE 4

PERFORMANCE OF POLYETHYLENIMINE/ISOPHTHALOYL DICHLORIDE MEMBRANES

Feed = 13 vol % 150N extract oil/NMP
Temperature = 70° C.
Pressure = 500 PSIG
Membrane = isophthaloyl dichloride in hexane reacted with polyethylenimine in water on a 0.04μ nylon membrane

| Wt % IPC | Wt % PEI | Flux (1/m² day) | Oil Rejection (vol. %) |
|---|---|---|---|
| 0.5 | 0.67 | 294 | 78.5 |
| 1.0 | 1.0 | 123 | 76.9 |

TABLE 5

PERFORMANCE OF 1,4-PHENYLENE DIAMINE/TRIMESOYL CHLORIDE MEMBRANES

Feed = 13 vol % MCT 10 extract oil/NMP
Temperature = 70° C.
Pressure = 500 PSIG
Membrane = trimesoyl chloride in hexane reacted with 1,4 phenylene diamine in water on a 0.04μ nylon membrane

| Wt % 1,4-PDA | Wt % TMC | Flux (1/m² day) | Oil Rejection (vol. %) |
|---|---|---|---|
| 1.0 | 0.15 | 1050 | 87.7 |
| | 0.38 | 1270 | 58.5 |
| | 0.50 | 1470 | 70.8 |
| 2.0 | 0.50 | 1100 | 81.4 |
| 4.0 | 0.15 | 802 | 96.9 |
| 4.0 | 0.15 | 580 | 95.4 |

TABLE 5-continued

PERFORMANCE OF 1,4-PHENYLENE DIAMINE/TRIMESOYL CHLORIDE MEMBRANES

| | | | |
|---|---|---|---|
| 4.0 | 0.5 | 615 | 90.8 |

1,4-PDA = 1,4 phenylene diamine
TMC = trimosoyl chloride

TABLE 6

PERFORMANCE OF 1,3-PHENYLENE DIAMINE/TRIMESOYL CHLORIDE MEMBRANES

Feed = 13 vol % Extract oil/Nmp
Temperature = 70° C.
Pressure = 500 PSIG
Membrane = trimesoyl chloride in hexane reacted with 1,3-phenylene diamine in water on a 0.04μ nylon membrane

| Wt % 1,3-PDA | Wt % TMC | Flux (1/m² day) | Oil Rejection (vol. %) |
|---|---|---|---|
| 4 | 0.15 | 1050 | 70 |

EXAMPLE 3

Membranes were prepared in a continuous manner on an interfacial polymerization machine using nylon 6,6 membrane with 0.04μ pore size obtained from Pall Ultrafine Filtration Corporation as support. Solutions were prepared of 4% 1,4-phenylene diamine in water and 0.14% trimesoyl chloride in Chevron 250B.

The membranes were prepared in a continuous manner on an interfacial polymerization machine. The nylon membrane support was moved through the machine by means of rollers at a web speed of 3 feet per minute. The nylon membrane first contacted a trough containing the amine solution at 40° C., was then allowed to partially dry as it travelled by rollers to a second trough where it contacted the trimesoyl chloride solution at room temperature. The membrane then travelled through an oven where it was heated at 125° F. for 5 minutes.

The contact time of the nylon membranes with the reactant solutions and the time of evaporation between contacting the amine solution and the trimesoyl chloride solution were different from laboratory conditions due to the physical constraints of the IFP machine. The contact time in the amine solution was 18 seconds (versus 1 minute in the laboratory). The evaporation period between the solutions was 3 minutes and 25 seconds (versus 1 minute in the laboratory), The contact time in the trimesoyl chloride solution was 12 seconds (versus 1 minute in the laboratory). The following results were obtained from 4 different runs on the IFP machine. Membrane performance was determined by circulating a sample of an extract oil solution (average molecular weight of oil=400 g/mole) containing 14 vol % oil in NMP over the membrane at 70° C. at an applied feed pressure of 500 PSIG. The permeate yield was kept below 5% to ensure that the feed composition did not change during testing. The membrane flux was recorded and permeate samples collected. The volume percent oil in both the feed and permeate samples was measured.

| Membrane | Flux 1/m² day | Oil Rejection vol % |
|---|---|---|
| A | 413 | 90 |
| B | 500 | 93 |
| C | 475 | 90 |

| Membrane | Flux l/m² day | Oil Rejection vol % |
|---|---|---|
| D | 650 | 71 |

The membrane flux observed was comparable to the laboratory prepared membranes but the oil rejection was somewhat erratic and lower than the laboratory results. These results were attributed to the following. The nylon 6,6 membrane is very hydrophobic. It does not become completely saturated with the aqueous amine solution during the 18 seconds of contact. The aqueous solution then wicks into the interior of the nylon membrane during the evaporation period. The short contact time with the trimesoyl chloride solution may not have been sufficient for adequate contact with the PDA solution in the interior of the membrane leading to defects in the membrane.

These membranes were also observed to contain crystals of PDA as a result of using a saturated aqueous solution of PDA. The adhesive used for element manufacture exhibited very poor bonds with these membranes containing crystals and hence these membranes were unacceptable.

EXAMPLE 4

An effort was made to reduce the crystals in the membranes by reducing the concentration of the amine solution keeping other factors constant. The following results were obtained on testing these membranes using the same test conditions as before.

| Membrane | % 1,4-PDA | Flux l/m² day | Oil Rejection vol % |
|---|---|---|---|
| E | 3.5 | 525 | 86 |
| F | 2.0 | 400 | 71 |

As the 1,4-PDA concentration decreased to 2.0%, the oil rejection decreased to 71 vol %. In contrast, a laboratory sample made with an even lower concentration of 1,4 PDA of 1% showed an oil rejection of 87.7%. (See Table 5) The poor result of the machine produced membranes can be attributed to the very short contact times in the reactant baths. It is known in the prior art that longer contact times can increase the extent of reaction occurring between the two reactants (U.S. Pat. No. 3,951,815). The contact time between the reactants was increased to approximately that of the laboratory study.

The web speed on the IFP machine was changed to 1 foot per minute. This increased the contact time in the amine solution to 50 seconds, the in-between evaporation period to 10 minutes and 25 seconds, and the contact time in the trimesoyl chloride solution to 45 seconds. Backside wetting of the nylon membrane in the amine solution plus the longer contact time ensured that the nylon membrane was saturated with the amine solution and that adequate reaction occurred in the trimesoyl chloride bath. Membranes were prepared with varying amine concentrations and were reacted with a 0.25% trimesoyl chloride solution. Using the same test procedure as before, the following results were attained.

| Membrane | % 1,4-PDA | Flux l/m² day | Oil Rejection vol % |
|---|---|---|---|
| G | 2.0 | 350 | 96 |
| H | 2.0 | 315 | 96 |
| I | 1.2 | 340 | 96 |
| J | 0.6 | 400 | 92 |
| K | 0.3 | 325 | 88 |

Down to an amine concentration of 1.2%, membranes with 96 vol % oil rejection were obtained These membranes contained no crystals and exhibited strong bonds with the adhesive used for element preparation.

EXAMPLE 5

A vacuum gas oil distillate, having a viscosity of 4.93 cSt at 100° C., a refractive index of 1.4538 at 75° C., and a density of 0.8668 kg/dm³ at 15° C., was countercurrently contacted in a commercial extraction tower with NMP containing 2.1% water. The tower bottoms temperature was 52° C.

A part of the extract solution, containing 9.7 wt. % oil was passed through a membrane unit, using an interfacially polymerized membrane of 1,4-phenylene diamine and trimesoyl chloride, operating at 93° C., which recovered a predominantly NMP permeate. The retentate of this unit, now containing 12.9 wt. % oil was equilibrated at the tower bottoms temperature of 52° C. to produce a pseudo raffinate.

In a preferred mode of the invention, the equilibration settling drum and the membrane unit operate at the extraction tower bottoms temperature, which can be accomplished by lowering the membrane unit operating temperature, or by increasing the extraction tower temperature. The extraction tower temperature can be increased without affecting the product quality by lowering the solvent treat ratio and/or by increasing the solvent water content.

Material balance data around the extraction tower, the membrane unit and the settling drum indicated that 3.2 grams of pseudo raffinate solution was produced for every 100 grams of feed. Side by side extraction runs of distillate and a blended bead of distillate and pseudo raffinate in a countercurrent laboratory extraction unit are illustrated in the following table.

TABLE 7

| | Base Case 1 | Base Case 2 | Recycle Case |
|---|---|---|---|
| Distillate feed, wt. | 100 | 100 | 100 |
| Pseudo raffinate, wt % on distillate | 0 | 0 | 3.2 |
| Raffinate RI | 1.4538 | 1.4534 | 1.4536 |
| Raffinate Density | 0.8665 | 0.8658 | 0.8666 |
| Solvent Treat (LV % on distillate) | 186 | 194 | 190 |
| Raffinate Yield (LV % on distillate) | 80.8 | 79.6 | 83.5 |
| Adjusted Raffinate Yield[1] (LV % on distillate) | 80.5 | 80.4 | 83.3 |

[1]After correction to equal raffinate quality and 186% solvent treat

Results clearly illustrate the superior yield that is obtained by using the current invention.

EXAMPLE 6

To determine preferred operating ranges for the invention, three primary extract solutions were prepared, with different oil concentrations. Subsequently, the NMP content of the solution was reduced, while the solution was maintained at the miscibility temperature of the base case, and the quantity and quality of the pseudo raffinate oil was measured. Results are shown in the following table.

TABLE 8

| Run A: Primary extract with 9.7% oil | | | | |
|---|---|---|---|---|
| NMP Reduction - removed by membrane | Base | −27% | | |
| Oil concentration | 9.7 | 12.9 | | |
| Pseudo Raffinate Yield, LV % on extract oil | — | 13.8 | | |
| Base Case Extract RI | 1.5426 | | | |
| Pseudo Raffinate RI @ 75 C. | — | 1.4651 | | |
| Run B: Primary extract with 18% oil | | | | |
| NMP Reduction (simulated) | Base | −20% | −40% | −60% |
| Oil concentration | 18 | 22 | 27 | 35 |
| Pseudo Raffinate Yield, LV % on extract oil | — | 8.1 | 12.6 | 19.3 |
| Base Case Extract RI | 1.5287 | | | |
| Pseudo Raffinate RI @ 75 C. | — | 1.4678 | 1.4733 | 1.4821 |
| Run C: Primary extract with 24% oil | | | | |
| NMP Reduction (simulated) | Base | −20% | −40% | |
| Oil concentration | 24 | 28 | 34 | |
| Pseudo Raffinate Yield, LV % on extract oil | — | 0.7 | 0.8 | |
| Base Case Extract RI | 1.5287 | | | |
| Pseudo Raffinate RI @ 75 C. | — | 1.4813 | 1.4888 | |

In Run A, NMP removal was accomplished by permeating part of the solution through a membrane, while in Run B and C, the membrane solvent removal was simulated by blending of extract oil and solvent in the appropriate proportions.

The table illustrates that solvent removal generates effectively a pseudo raffinate if the initial extract oil concentration is 10 and 18% oil, but is less effective if the initial oil concentration is 24%. It is expected that the invention will perform well with initial primary extract concentrations of less than 10% oil, but that the economic attractiveness of the primary extraction step would decrease because of the large quantities of solvent that would be required. Thus, the preferred primary extract oil concentration is between 5 and 25% oil in extract solution, and the most preferred oil concentration between 10 and 18% oil.

It is interesting to note that in Run B, solvent removal beyond the 24% oil concentration demonstrated in Run C remains effective in generating more pseudo raffinate, and that apparently the initial concentration of the oil is the main factor determining the quantity and quality of pseudo raffinate. However, at very high oil concentrations, the physical separation of the pseudo raffinate from the retentate in the settling vessel becomes more difficult, and the preferred oil concentration in the retentate of the membrane unit is between 10 and 35%, and most preferentially between 13 and 25%.

What is claimed is:

1. A method for the selective solvent extraction of aromatic hydrocarbons from mixtures of same with non-aromatic hydrocarbons in a hydrocarbon feed stream comprising contacting said hydrocarbon feed stream with a selective aromatic extraction solvent in a solvent extraction zone to produce an aromatics rich extract phase and an aromatics lean raffinate phase, passing the extract phase to a membrane separation unit which selectively permeates the solvent present in the extract and recovering a solvent lean retentate, passing the retentate to a settling zone wherein the retentate spontaneously separates into two liquid phases an upper phase and a lower phase, the upper phase containing good quality lubricating oil molecules, passing the upper phase back to the solvent extraction zone to thereby increasing the yield of raffinate, wherein the aromatics rich extract phase which is sent to the membrane separation unit contains from about 5 to 25% oil.

2. The method of claim 1 wherein the membrane separation zone comprises an interfacially polymerized crosslinked membrane on microporous organic solvent resistant ultrafiltration backing, said interfacially polymerized membrane comprising the reaction product of a multi-functional amino compound dissolved in water with a polyfunctional agent dissolved in an organic solvent, at least one of which reactants is trifunctional, on a backing, and said contacting is under reverse osmosis conditions.

3. The method of claim 2 wherein the multi-functional amino group reactant is selected from polyethylenimine, polyvinylamine, polyvinylaniline,polybenylamine, polyvinylimidazolines, amine modified polyepihalohydrines, m-phenylenediamine, p-phenylenediamine, triaminobenzine, piperazine, piperidine, 2,4-biz (2-amino-benzyl) aniline, cyclohexane diamine, cycloheptane diamine.

4. The method of claim 3 wherein the polyfunctional agent is selected from di- and tri- acid halides, acid anhydrides, aliphatic diisocyanates, aromatic diisocyanates, thioisocyanates, haloformates, sulfonylhalides and mixtures thereof.

5. The method of claim 2 wherein the multi-functional amine compound in water is at a concentration of 0.1 to 10 wt %, and the polyfunctional agent reactant in organic solvent is at a concentration of 0.1 to 5 wt %.

6. The method of claim 2 wherein the backing is selected from nylon, cellulose, polyester, teflon, polypropylene, polyethylene, polyethyleneterephthalate ultrafiltration membranes.

7. The method of claim 2 wherein the ultrafiltration membrane support layer has pores in the range 0.02 to 0.1 μm.

8. The method of claim 1 wherein the aromatics oil extract phase contains from about 10 to about 18% oil.

* * * * *